United States Patent
Bamford et al.

(10) Patent No.: US 9,377,613 B2
(45) Date of Patent: Jun. 28, 2016

(54) METHOD AND SYSTEM FOR SPECTRAL UNMIXING OF TISSUE IMAGES

(75) Inventors: Pascal Bamford, Dublin, CA (US);
Michael Otter, Tucson, AZ (US);
Ronald T. Kurnik, Foster City, CA (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 282 days.

(21) Appl. No.: 14/112,354

(22) PCT Filed: May 4, 2012

(86) PCT No.: PCT/EP2012/058253
§ 371 (c)(1),
(2), (4) Date: Oct. 17, 2013

(87) PCT Pub. No.: WO2012/152693
PCT Pub. Date: Nov. 15, 2012

(65) Prior Publication Data
US 2014/0078286 A1     Mar. 20, 2014

Related U.S. Application Data

(60) Provisional application No. 61/483,202, filed on May 6, 2011.

(51) Int. Cl.
*G02B 21/36* (2006.01)
*G06K 9/00* (2006.01)
*G06K 9/46* (2006.01)

(52) U.S. Cl.
CPC ............ *G02B 21/361* (2013.01); *G06K 9/0014* (2013.01); *G06K 2009/4657* (2013.01)

(58) Field of Classification Search
None
See application file for complete search history.

(56) References Cited

U.S. PATENT DOCUMENTS

| | | | |
|---|---|---|---|
| 6,262,837 B1 | 7/2001 | Nagano et al. | |
| 2004/0223152 A1 | 11/2004 | Atzeni et al. | |
| 2008/0212866 A1 | 9/2008 | Lett et al. | |
| 2009/0201499 A1* | 8/2009 | Monk | G01J 3/02 356/310 |
| 2009/0219407 A1* | 9/2009 | Padwick | G06K 9/0063 348/222.1 |
| 2009/0245605 A1* | 10/2009 | Levenson | A61B 5/0059 382/128 |

(Continued)

FOREIGN PATENT DOCUMENTS

| | | |
|---|---|---|
| EP | 732582 A2 | 1/1999 |
| JP | 2006242899 A | 9/2006 |
| JP | 2008215033 A | 9/2008 |
| JP | 201020298 A | 1/2010 |
| JP | 2010512508 A | 4/2010 |

OTHER PUBLICATIONS

Eismann, et al., "Stochastic Mixture Modeling", In: Chein-I Chang: "Hyperspectral Data Exploitation: Theory and Applications.", Dec. 1, 2008, pp. 107-148

(Continued)

*Primary Examiner* — Eileen Adams
(74) *Attorney, Agent, or Firm* — Yakov Sidorin; Quarles & Brady, LLP

(57) ABSTRACT

A method and system for spectral demultiplexing of fluorescent species, such as quantum dots, conjugated with a biological tissue. The process of demultiplexing involves a nonliner regression based on curve-fitting of estimated spectra of the quantum dots and confidence intervals describing the parameters of such fitting curve for typical quantum dots.

21 Claims, 8 Drawing Sheets

(56) References Cited

U.S. PATENT DOCUMENTS

2012/0112098 A1* 5/2012 Hoyt .................. B82Y 30/00
250/459.1
2012/0136225 A1* 5/2012 Benni .................. A61B 5/4255
600/323

OTHER PUBLICATIONS

Burton, et al., "Spectral Optical Imaging in Biology and Medicine", Biomedical Optical Imaging, Apr. 22, 2009, pp. 29-72.

Aguet, et al., "An Introduction to Fluorescence Microscopy", In: Jens Rittscher:"Microscopic Image Analysis for Life Science Applications", Jan. 1, 2008 pp. 85-114.

Stein, "Application of the Normal Compositional Model to the Analysis of Hyperspectral Imagery", Advances in Techniques for Analysis of Remotely Sensed Data, 2003 IEEE Workshop Oct. 27-28, 2003 pp. 44-51.

Pinaud, et al., "Advances in Fluorescence Imaging with Quantum Dot Bio-Probes", Biomaterials, Elsevier Science Publishers vol. 27, No. 9 Mar. 1, 2006 pp. 1679-1687.

Japan Patent Office, Notification of Reasons for Refusal, Application No. 2014-508819, Oct. 30, 2015.

* cited by examiner

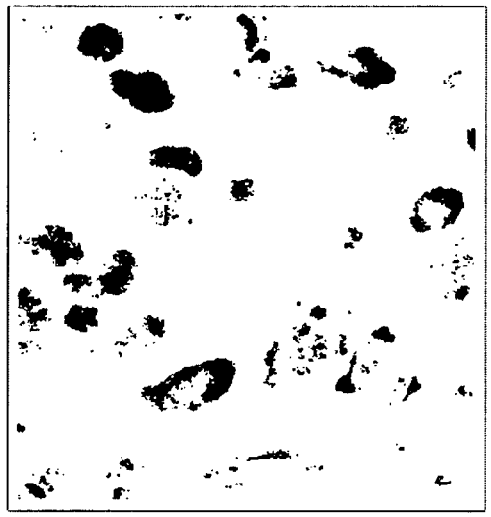
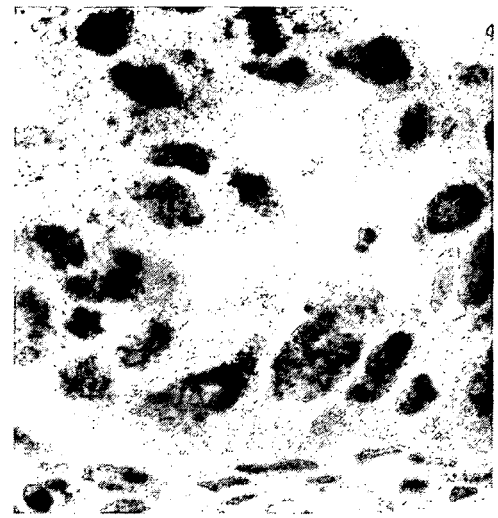
FIG. 5A　　　　　　　　　　FIG. 5B
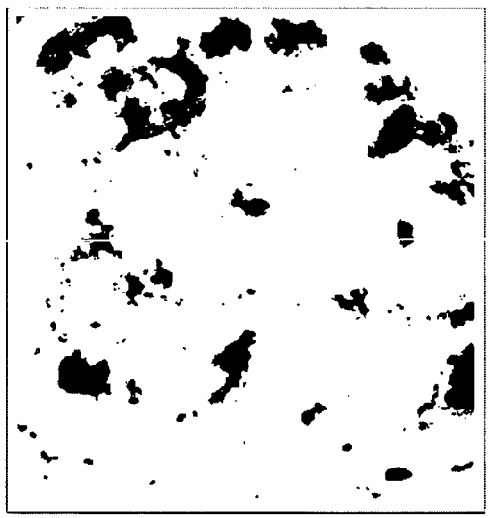
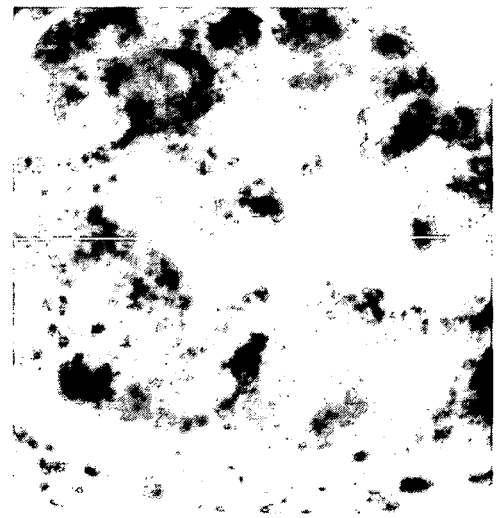
FIG. 6A　　　　　　　　　　FIG. 6B

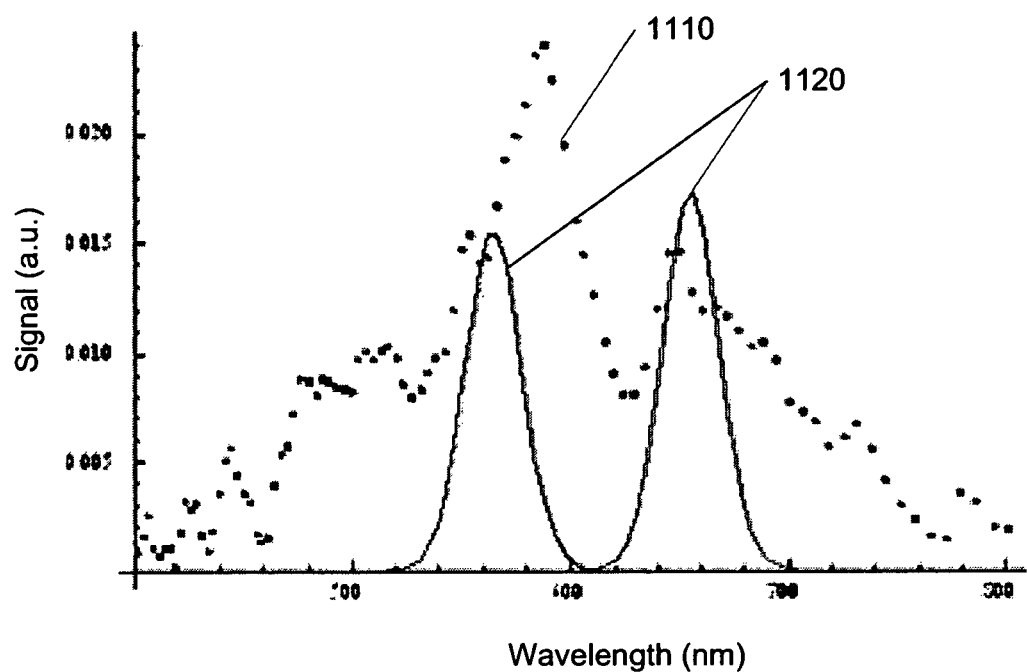
FIG. 11
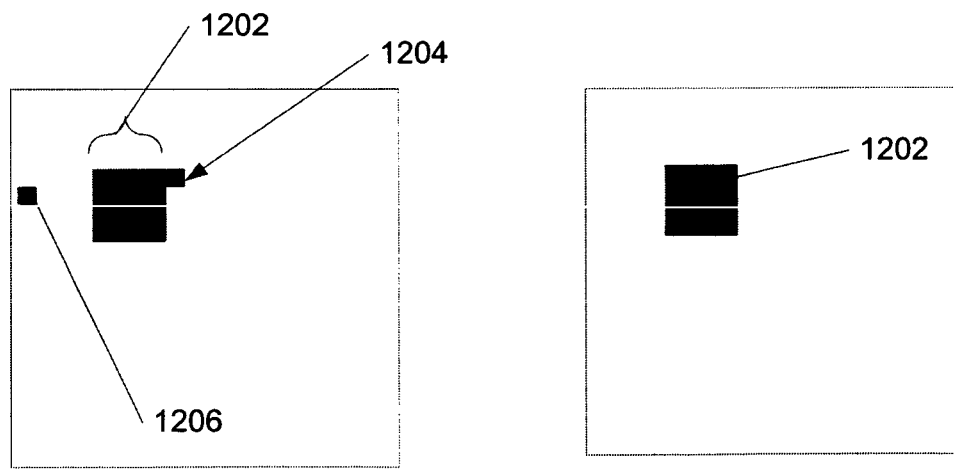
FIG. 12A
FIG. 12B

METHOD AND SYSTEM FOR SPECTRAL UNMIXING OF TISSUE IMAGES

TECHNICAL FIELD

The present invention relates to spectral decomposition of multispectral images and, more particularly, to a non-linear regression, of imaging data characterizing a biological sample marked with quantum dots, that provides for identifying individual spectral signatures of the quantum dots and components of the tissue marked with these quantum dots.

BACKGROUND ART

A quantum dot (QD) is a semiconductor, nanocrystal structure the electronic characteristic of which is closely related to the size and shape of an individual semiconductor crystal. The energy spectrum of a quantum dot can be engineered by defining the quantum confinement effect via controlling the geometrical size, shape, and the strength of the confinement potential. An immediately resulting optical feature of a QD is, therefore, its coloration: QDs of the same material, but of different sizes, can emit light of different colors. The QD coloration is directly related to the energy levels of the QD. Generally, the larger the QD, the redder (lower energy) its fluorescence spectrum. Conversely, smaller QDs emit bluer (higher energy) light. Researchers have studied QDs in transistors, solar cells, LEDs, and diode lasers and attempted to use quantum dots as agents for medical imaging, in particular as fluorescent labels for biosensing applications.

In modern biological analysis, various kinds of organic dyes are used. With each passing year, however, more operational flexibility is being required of these dyes, and the traditional dyes are often unable to meet the expectations.

To this end, QDs may be quickly filling in the role, being found to be superior to traditional organic dyes on several counts, two of the most immediately obvious being narrower fluorescent bandwidth and brightness (owing to the high extinction coefficient combined with a comparable quantum yield to fluorescent dyes) as well as stability. Attempts have been made to use QDs for biological tissue targeting. To effectuate such targeting, the QDs are often functionalized with tissue-specific binding sites to selectively bind to a chosen portion of the tissue. For example, QDs may be used as inorganic fluorophore for detection of biological tissue components using fluorescence spectroscopy. Here, a QD may be used as a component of a tissue molecule that causes this molecule to fluoresce in a way that specifically identifies the corresponding type of tissue components. By detecting the QD-specific fluorescence of the tissue sample at hand, a conclusion can be made about the biological structure of the tissue and/or the location of a tissue component.

However, detection of fluorescence of tissue marked with several fluorescent species presents several unresolved problems. One of the problems is an issue of optical registration, and it stems from a spatial overlap of wavefronts, emitted by multiple fluorophores selectively bound to the components of the tissue, on a surface of the optical detector. This spatial overlap results in a spatially-convoluted multi-spectral image and necessitates a spectral decomposition of the resulting image of the tissue in order to satisfactorily identify the physical location of a given component within the bounds of the tissue, in the object space.

To separate individual spectral contributions of the fluorophores, the conventional multiplexed fluorescence microscopy has employed, on the one hand, broadband fluorophore dyes and carefully selected optical filters and, on the other hand, linear unmixing spectral algorithms. Filter-based methods are known to be limited in their ability to quantitatively distinguish closely overlapping spectral signatures due to spectral cross-talk and insufficient sampling. The use of linear unmixing algorithms for signal separation is capable of addressing the sampling deficiency presented by filter-based acquisition, but demands a careful selection of reference spectra. Indeed, for a linear unmixing algorithm to operate optimally, either accurately selected reference spectra or low-artifact conditions (such as autofluorescence) are needed. In real applications, however, where large variations and tolerances of operating parameters are present, the accuracy and stability of conversion of linear unmixing algorithms degrades rapidly.

It is desired, therefore, to provide apparatus and method capable of reliable spectral decomposition of a multispectral image of a tissue having different QDs selectively bound to the corresponding tissue components and of producing, with improved accuracy, tissue images defining QD-specific tissue components.

SUMMARY OF THE INVENTION

Embodiments of the present invention provide for an apparatus for imaging a biological sample. One embodiment of an apparatus includes an input that is adapted to receive either imaging data acquired from the biological sample, or an image of such sample, or both, where the sample is illuminated with a light source located at the sample. In a specific embodiment, the received image of the biological sample includes a multispectral image representing a plurality of spectrally-discrete images acquired in a corresponding plurality of discrete spectral bands. Light from the light source is characterized by a mean wavelength and its spectral intensity is described by a statistical distribution. The apparatus also includes a processor adapted to receive either the imaging data or the image or both from the input, to non-linearly regress spectral data associated with the received imaging data or image, and to generate data representing a target image of the biological sample at the mean wavelength of the light source. In a specific implementation, an apparatus further includes a display operationally connected to the processor and is configured to display the target image of the biological sample. The display may additionally be configured to display an image of the light source superimposed on the target image. In a specific embodiment, the location of the light source at the sample is defined by affinity between the light source and a particular component of the biological sample. In a related embodiment, the sample is illuminated with a plurality of light sources, in which case the processor is adapted to non-linearly regress the imaging data by fitting these data to a function representing a combination of the statistical approximations to the spectral distributions of each of the light sources involved, and to evaluate the results of the regression with respect to confidence intervals corresponding to such statistical distributions.

Embodiments of the invention also provide for a method for transforming a pathology image, which includes at least (i) receiving a set of images of a tissue sample having a fluorescent species disposed thereon to acquire a spectral distribution of light intensity representing said tissue sample; and (ii) modifying the acquired spectral distribution of intensity based on at least non-linear regression and data confidence intervals defined by this fluorescent species such as to derive a target distribution of light intensity representing the tissue image in a target spectral band which, in a specific case, is defined by the target spectral data and data confidence intervals. In one embodiment, the target spectral band is defined by at least one of statistical distributions such as a Gaussian distribution, an inverse Gaussian distribution, an exponentially modified Gaussian distribution, a Gamma distribution, an inverse Gamma distribution, a logarithmic distribution, a t-distribution, a chi-square distribution, an f-distribution, an exponential distribution, a Laplace distribution, a Rayleigh distribution, a logistic distribution, a Maxwell distribution, a beta distribution, a Cauchy distribution, a Pareto distribution, a Levy distribution, an extreme value distribution, a Weibull distribution, and a Gumbell distribution.

Alternatively or in addition, the method includes mapping the target distribution of light intensity into a visually-perceivable representation of an optical response of the tissue sample to light emitted by said fluorescent species. In specific embodiments, the optical response of the tissue sample represents a reflection of light emitted by fluorescent species, and the received set of images includes two-dimensional images acquired in a plurality of discrete spectral bands. In one embodiment, the process of mapping involves off-setting the target distribution such as to derive an off-set light intensity distribution that is devoid of intensity of background noise. In one embodiment, the off-setting involves assigning values of the target distribution of light intensity to elements of a data array; determining a mean value of non-zero-element of the data array; and zeroing elements of the data array that contain values lower than said mean value. The process of off-setting may additionally include a process involving the use of an order 1 cross-matrix.

Alternatively or in addition, an embodiment of the method involves conjugating said fluorescent species with the surface of said tissue sample, wherein the association is representative of a material structure of said tissue sample. Alternatively or in addition, the receiving of the set of images includes receiving a hypercube image of the tissue sample that has other fluorescent species thereon. In one embodiment, the modifying of the acquired spectral distribution of intensity includes a non-linear regression of the acquired spectral distribution to a fitting function that defines a linear superposition of estimated fluorescent spectra of the fluorescent species conjugated with the tissue sample. In a specific embodiment, the non-linear regression is carried out by assuring that at least some of parameters defining the estimated fluorescent spectra are fixed within the data confidence intervals.

In addition, embodiments of the invention provide a computer program product, for use on a computer system, for imaging a biological sample. Such computer program product contains a computer-usable tangible medium having computer-readable program code thereon, which, when loaded into the computer system, establishes the apparatus, implemented in the computer system, which apparatus includes (i) an input configured to receive image data arrays representing images of the biological sample, where each of said images has been acquired in a respectively corresponding discrete spectral band by imaging the biological sample, illuminated with light from a plurality of light sources in the object field, through an optical system into an image field; and (ii) a processor adapted to transform at least one of the received image data arrays into at least one accustomed image data array, representing an accustomed image of the biological sample at a chosen corresponding mean wavelength.

Each of light sources illuminating the sample has a corresponding mean wavelength. At least one light source may be polychromatic and have a spectrum described by a statistical distribution. In one embodiment, the input is configured to receive image data sets representing images that have been acquired by imaging the sample that is illuminated with the light source disposed at the sample.

In one embodiment, the processor facilitates the transformation of at least one image data array, from the received data image arrays, by determining a spectral distribution of intensity across a predetermined portion of the image field; and by non-linearly regressing the determined spectral distribution of intensity to derive regressed parameters representing spectral distributions of light sources from the plurality of light sources. In a specific embodiment, the apparatus implemented in the computer system additionally includes a graphical output configured to display at least one of the acquired and accustomed images. The processor may additionally be adapted to transform at least one of the received image data arrays by creating a data array representing a distribution of target intensity, across the image field, of a target light source from the plurality of light sources; and setting an element of this data array to zero if the value of target intensity corresponding to the element is less than a mean of the non-zero values of the data array.

Embodiments of the invention additionally provide a system for imaging a biological sample, which includes an optical system, a computer processor in operable communication with the optical system, and a tangible computer-readable storage medium. The optical system includes (i) an input configured to receive light from the biological sample that contains at least one light source united with the biological sample; (ii) an output in optical communication with the input along at least one optical axis; (iii) a spectrally-selective system disposed along at least one optical axis between said input and said output and configured to process the light in a plurality of spectral bandwidths to form a plurality of image-forming signals corresponding to said plurality of spectral bandwidths; and (iv) a detector configured to receive, from the output, the plurality of image-forming signals corresponding to the plurality of spectral bandwidths and to form a plurality of images based on these signals.

In one embodiment, the light source at the sample includes a source of fluorescent light such as, for example, a quantum dot. In one embodiment, the computer processor is operably connected with the detector of the optical system. In one embodiment, the tangible non-transitory storage medium is embedded computer-readable instructions which, when loaded onto the computer processor, cause the processor to derive, from the plurality of images, a spectral distribution of intensity representing the biological sample; and to apply a non-linear regression algorithm to a curve-fit equation to determine a distribution of intensity of light of the light source, united with the sample, across the biological sample. When there is more than one light source associated with the biological sample, a curve-fit equation is defined by a superposition of spectral distributions of light emitted by such multiple light sources.

Embodiments of the invention further provide a method for identifying a biological structure of a tissue sample with the use of a quantum dot (QD). Such method contains receiving image-forming light, from the tissue sample, which image-forming light includes light emitted by a QD species conjugated with a component of the tissue sample in accordance with a predetermined affinity between the QD species and the tissue component; and analyzing the received image-forming light in a plurality of spectral bands to determine a spectral distribution of intensity of this image-forming light. The method additionally includes estimating a spectral distribution of the QD species with a parametric fitting function and confidence intervals defining parameters of said parametric fitting function; and deriving image data representing spatial position of the component of the tissue sample in a spectral bandwidth corresponding to said QD species. A specific parametric function includes a statistical distribution function.

In one embodiment, the method additionally includes specifying the component of the tissue sample based on the derived image data and the predetermined affinity between the QD species and the component of the tissue sample. In one embodiment, the process of derivation of the image data includes non-linearly regressing the estimated spectral distribution of the QD species to determine regressed parameters, of the parametric fitting function, that satisfy the confidence intervals. In a related embodiment, the process of derivation includes generating an image of the tissue sample.

BRIEF DESCRIPTION OF THE DRAWINGS

The invention will be more fully understood by referring to the following Detailed Description of Specific Embodiments in conjunction with the Drawings, of which:

FIGS. 5A and 5B show experimental results of spectral unmixing of a first quantum dot species from a multispectral image of a biological tissue marked with five quantum dot species.

FIGS. 6A and 6B show experimental results of spectral unmixing of a second quantum dot species from a multispectral image of a biological tissue marked with five quantum dot species.

FIGS. 10A, 10B, and 11 illustrate an advantage of using an embodiment of the present invention in unmixing spectral signatures of fluorescent species at the sample over a conventional method of regression, manifesting itself in a higher signal-to-noise ratio.

FIGS. 12A, 12B show the removal of residual background noise as a result of an image opening procedure, according to an embodiment of the invention.

DETAILED DESCRIPTION OF SPECIFIC EMBODIMENTS

Figure 1A:
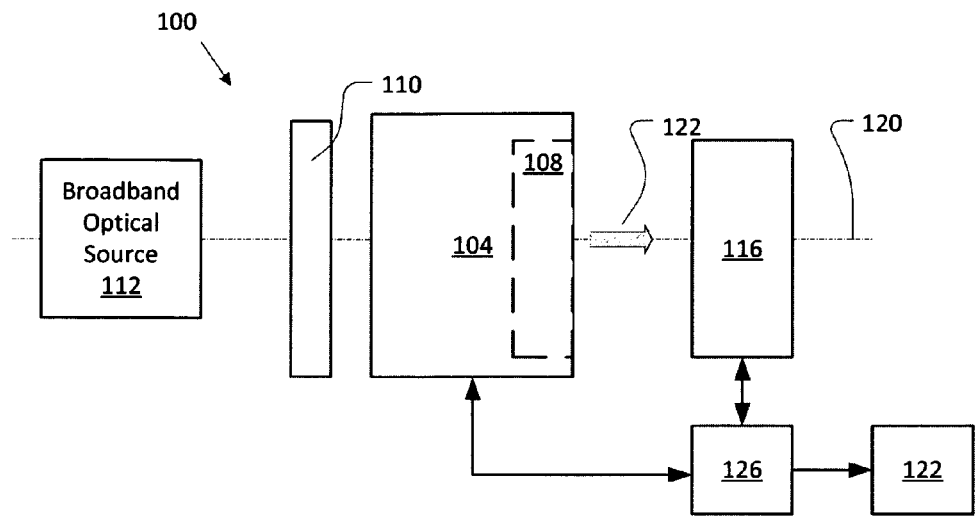
FIGS. 1A and 1B schematically illustrate examples of multispectral imaging (MSI) systems that can be used with the present invention.

The following specification provides a description of the embodiments of the invention with reference to the accompanying drawings. In the drawings, wherever possible, the same reference numerals and labels refer to the same or like components or elements. It will be understood, however, that similar components or elements may also be referred to with different numerals and labels.

Throughout this specification, a reference to "one embodiment," "an embodiment," or similar language implies that a particular feature, structure, or characteristic described in connection with the embodiment referred to is included in at least one embodiment of the present invention. Thus, phrases "in one embodiment," "in an embodiment," and similar terms used throughout this specification may, but do not necessarily, all refer to the same embodiment. Moreover, it will be understood that features, elements, components, structures, details, or characteristics of various embodiments of the invention described in the specification may be combined in any suitable manner in one or more embodiments. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention.

The schematic flow chart diagram that is included is generally set forth as a logical flow-chart diagram. As such, the depicted order and labeled steps of the logical flow are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

In accordance with the present invention, methods and apparatus are disclosed for processing, of multispectral images of a biological tissue, that allows for spatial identification of portions of the tissue by non-linearly separating spectral signatures of fluorophores such as QDs, in the image space, from a plurality of spectral signatures that have been multiplexed through the process of imaging.

QDs are used in labeling pathological examination of tissues, by conjugating the QDs to certain antibodies or probes. These antibodies or probes bind to certain receptors of interest, in particular receptors correlated with viruses or cancer. The process of labeling is often spectrally multiplexed, in the sense that multiple QDs fluorescing at different wavelengths are used. In order to use the resultant tissue for diagnostic purposes, it is then necessary to view the individual QD, and to ascertain their position(s) within the tissue. Thus, a method to unmix (or demultiplex, or spectrally separate) an optical response of used QDs from the multispectral image of the tissue needs to be accomplished.

Figure 10A:
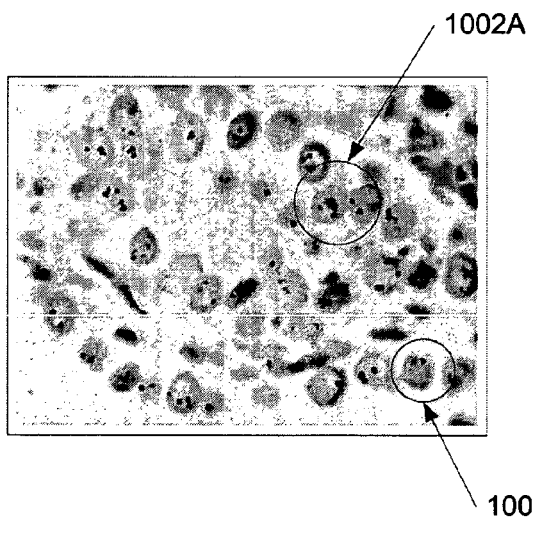
Figure 10B:
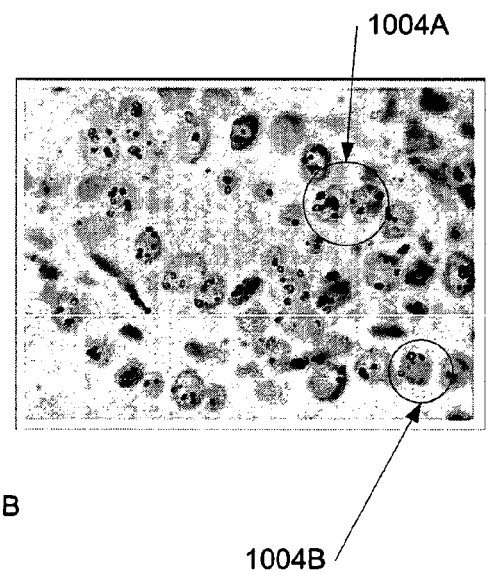

In accordance with embodiments of the present invention, to effectuate such spectral demultiplexing, images of the tissue are initially acquired in spectral bands that aggregately span the spectral range defined by spectral characteristics of QDs used for labeling. Once such images have been obtained, a nonlinear regression of the estimated QD intensity distribution function can be further performed, for example on a pixel-by-pixel basis. The nonlinear regression can be carried out on the basis of a fitting curve that represents a combination of estimated spectral distributions (spectral signatures) characterizing the used QDs. The nonlinear regression may be further optimized to achieve a curve fit, for either of the fluorescent spectral distributions of the used QDs, that contains only non-negative values. The present invention leverages the unique imaging conditions presented by QDs in comparison with conventional fluorescent dyes that have broad fluorescence signatures (for example, bandwidths up to 50-60 nm, which spectrally overlap on many occasions and cause signal acquisition cross-talk upon being detected). In particular, the invention offers an ability to parametrically describe the relatively narrow (on the order of 10-20 nm) spectral signatures of the QDs interest in a low-dimensional, and hence analytically tractable, space. Such parametric description and rigorous minimization conditions enable a high-level of computational adaptability and stability of the method of the invention to the changing operational conditions such as, for example, variations of spectral signals that are common in dealing with biological tissues. As a result of the increased adaptability and stability, the signal-to noise ratio at the output of the overall measurement system employing an embodiment of the invention is enhanced, as compared to the systems of related art. FIGS. 10A and 10B, for example, represent images containing the results of unmixing of the spectral signatures of the single QD-species, present at the sample, with a non-linear method according to an embodiment of the present invention (FIG. 10A) and those obtained with a conventional linear regression algorithm. The comparison between these images clearly illustrates a visually-perceivable higher level of image noise corresponding to falsely identified QD-species when a linear type of regression is used (compare, for example, the densities of unmixed individual QDs in the areas 1002A, 1002B with those in the respectively corresponding areas 1004A, 1004B). As an additional illustration, FIG. 11 shows a spectral curve 1120 representing the results of linear unmixing procedure identifying two QD species, QD565 and QD655 (Life Technologies Corp.). The correct result in this case, however, is the identification of a single QD species, QD585 (Life Technologies Corp.), as shown by a spectral curve 1110, which the non-linear unmixing algorithm of the present invention identified correctly.

The invention may be employed with an imaging system such as a multispectral imaging (MSI) system or a fluorescent microscopy system. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

Figure 1B:
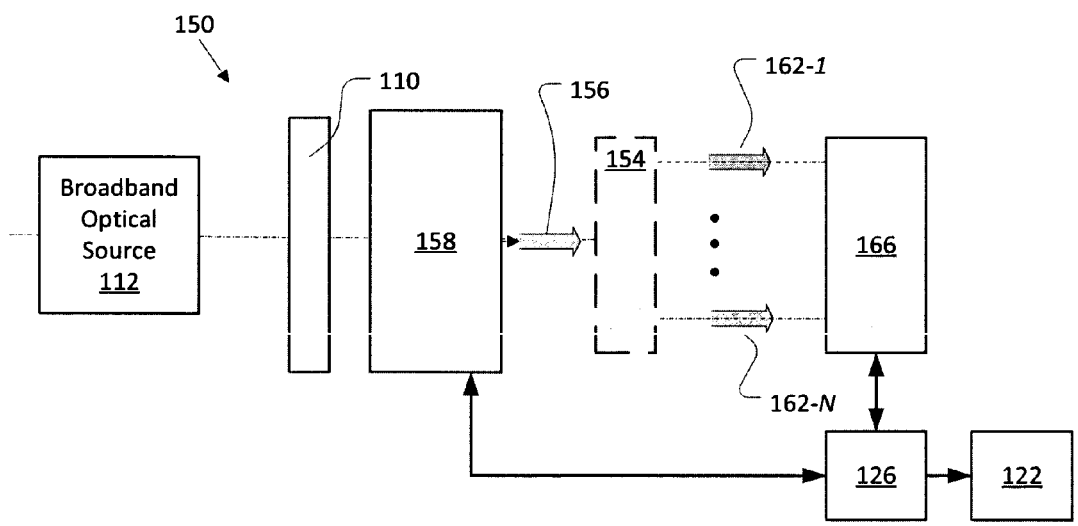

Two common types of an MSI system facilitating the acquisition of images of a specimen are schematically illustrated in FIGS. 1A and 1B. FIG. 1A shows an apparatus 100 including an optical imaging system 104, a portion 108 of which contains a spectrally-selective system that is tunable to define a pre-determined number N of discrete optical bands. The optical system 104 is adapted to image a tissue sample 110, illuminated in transmission with a broadband light source 112 onto an optical detector 116. As shown, the optical imaging system 104, which in one embodiment may include a magnifying system such as, for example, a microscope, has a single optical axis 120 generally spatially aligned with a single optical output 122 of the optical system 104. The system 104 forms a sequence of images of the tissue 110 as the spectrally-selective system 108 is being adjusted or tuned (for example with a computer processor 126) such as to assure that images are acquired in different discrete spectral bands. The apparatus 100 may additionally contain a display 122 in which appears at least one visually-perceivable image of the tissue from the sequence of acquired images. The spectrally-selective system 108 may include an optically-dispersive element such as a diffractive grating, a collection of optical filters such as thin-film interference filters or any other system adapted to select, in response to either a user input or a command of the pre-programmed processor 126, a particular pass-band from the spectrum of light transmitted from the light source 112 through the sample 110 towards the detector 116.

An alternative implementation 150 of an apparatus adapted to simultaneously take a multiplicity of spectrally-discrete optical images in several spectral bands is shown in FIG. 1B. Here, the spectrally-selective system 154 defines several optical outputs corresponding to N discrete spectral bands. The system 154 intakes the transmitted light output 156 from the optical system 158 and spatially redirects at least a portion of this light output along N spatially different optical paths 162-1 through 162-N in such a way as to image the sample 110 in an identified spectral band onto a detector system 166 along an optical path corresponding to this identified spectral band. It is appreciated that another alternative embodiment (not shown) may combine features of the embodiments 100 and 150.

Figure 2A:
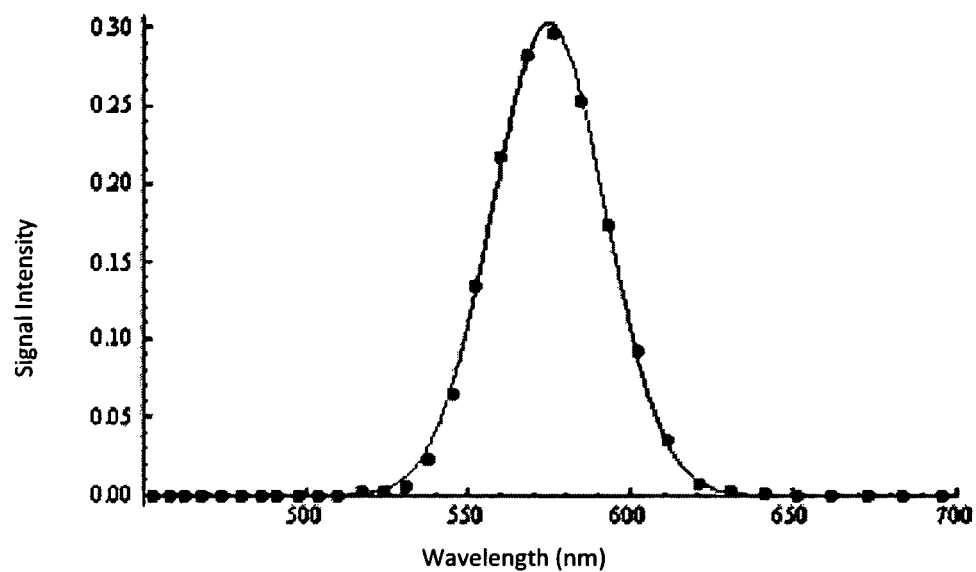
FIGS. 2A and 2B show typical spectra of quantum dot species with overlapped Gaussian fitting curves.
Figure 2B:
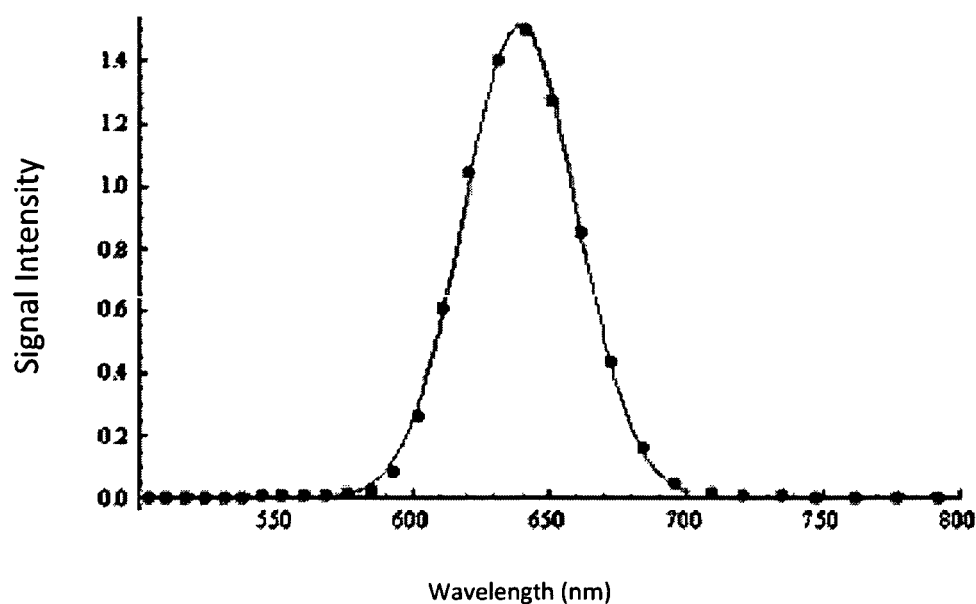

In accordance with an embodiment of the invention, a biological tissue is labeled with fluorescent species such as QDs. Two typical spectra for the QDs used are shown in FIGS. 2A and 2B, each overlaid with a corresponding curve fit that, in the case of FIGS. 2A, 2B is a Gaussian distribution generally expressed as:

$$\frac{a^2}{\sigma\sqrt{2\pi}}\exp\left[-\frac{1}{2}\left(\frac{\lambda-\mu}{\sigma}\right)^2\right], \quad (1)$$

where $\lambda$ is wavelength, $\mu$ is the mean value, $\sigma$ is the standard deviation, and $a^2$ is a non-negative pre-exponential. The values of parameters describing intensity distributions of FIGS. 2A, 2B are shown in Table 1, wherein a QD species emitting light in the vicinity of 565 nm is labeled as QD565, and that emitting light in the vicinity of 655 nm is labeled as QD655.

TABLE 1

|   | QD565 (FIG. 2A) | QD655 (FIG. 2B) |
|---|---|---|
| α | 3.62 | 8.89 |
| μ | 574.74 | 639.52 |
| σ | 17.35 | 20.80 |

By employing a non-negative $a^2$ instead of a more conventional Gaussian amplitude factor a, the Gaussian distribution used in embodiments of the present invention has positive values (which correlates with positive values of intensity distribution of QD light). It is appreciated, however, that other spectral profiles of light emitted by QDs such as those closely approximated by another statistical distribution (for example, an inverse Gaussian, an exponentially modified Gaussian, a Gamma distribution, an inverse Gamma distribution, a logarithmic distribution, a t-distribution, a chi-square distribution, an f-distribution, an exponential, a Laplace distribution, a Rayleigh distribution, a logistic distribution, a Maxwell distribution, a beta distribution, a Cauchy distribution, a Pareto distribution, a Levy distribution, an extreme value distribution, a Weibull distribution, and a Gumbell distribution) are within the scope of the invention.

In accordance with an embodiment of the invention, schematically presented in a flow-chart of FIG. 3, a given biological tissue having light sources, such as QDs, is imaged over a range of imaging wavelengths (referred to hereinafter as an imaging spectral range) such as, for example, from 400 nm to 900 nm, to generate a set of multi-spectral images, such as a hypercube image that includes a plurality of individual images of the tissue taken in individual spectral bands corresponding to the imaging wavelengths. The imaging may employ a MSI system, such as described above. The image(s) is received, at an input of the apparatus of the invention, at step 310. It is appreciated that, generally, imaging wavelengths at which the tissue is being imaged with the use of the MSI system do not necessarily coincide with a characteristic wavelength (such as a central wavelength, or a mean wavelength) of the spectrum of a particular QD. In one embodiment, the hypercube image may include spectrally-discrete images taken in spectral bands that substantially do not overlap. To separate a spectral signature of a given QD from a resulting multi-spectral hypercube image, a dynamic spectral range may be optionally selected, at step 314. The dynamic range may be narrower than the imaging spectral range and preferably corresponds to a spectral span that includes the estimated fluorescent spectrum of a given used QD species. For example, for a QD with an estimated mean wavelength of 565 nm (a Life Technologies Corp. product referred to as QD565), a dynamic spectral range between about 529 nm and 598 nm can be chosen.

Figure 3:
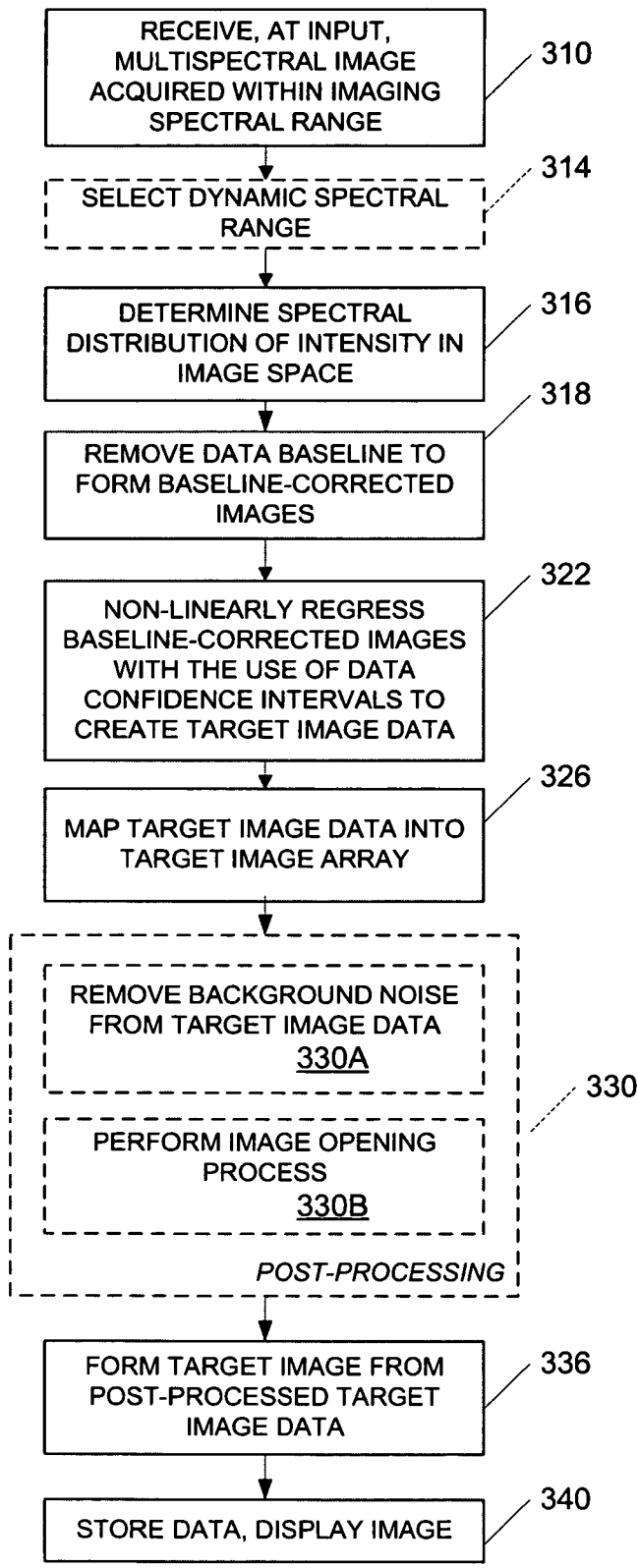
FIG. 3 is a flow-chart illustrating embodiments of the methods of the invention.

The following processing steps, as described in reference to FIG. 3, may be carried out with respect to a full hypercube image (taken within the full imaging spectral range), with respect to a subset of the hypercube image (corresponding to the chosen dynamic spectral range), or with another set or subset of images. These steps can be performed by processing the spectral data on a pixel-by-pixel basis or, alternatively, by operating on a cluster of pixels at a time by obtaining the average—or median—spectral distribution of image intensity over a group of adjacent pixels. The size of a single image may be chosen at a discretion of the user, depending on the available capabilities of optical detection equipment, and in one embodiment may be 800-by-600 pixels.

At step 316, the spectral distribution of intensity is derived from the acquired images by analyzing the chose set of individual images. At step 318, the derived spectral distribution of intensity is baseline-corrected by, for example, subtracting from each image data point the minimum value of intensity acquired over the chosen wavelength range. The baseline correction procedure concludes with generation of baseline-corrected image data. Alternatively, an image can be baseline-corrected by subtracting, from the value of intensity as defined by the image data at a point (x,y) of the image, a value of the fitting function (expressed by a polynomial of the first degree or higher) corresponding to that image point. Yet another alternative for baseline correction includes the use of principal component analysis (PCA) or the use of a Gaussian fitting function having a very large, for example, several tens of nm, standard deviation.

Each of the baseline-corrected images is further analyzed, at step 322, by non-linear regression, for example, using parametric definitions of spectra of the used QD species. The Levenberg-Marquardt algorithm (LMA), for example, is known to provide a numerical solution to the problem of minimizing a function, generally nonlinear, over a space of parameters of the function. According to the idea of the present invention, a non-linear regression algorithms such as the LMA may be used in conjunction with estimated parametric functions defining the spectra of QD disposed at the imaged tissue sample (for example, a Gaussian function of (1) for a single QD species or a combination of Gaussians or other statistical distributions for several QD species on the tissue). For example, in the case when there is a single QD species associated with the tissue being images, the non-linear LMA can be used in conjunction with a function fitting the QD-spectrum that defines one of the statistical distribution as mentioned above. In comparison, when there are multiple QD-species associated with the tissue being imaged, the LMA can be used in conjunction with a fitting function that defines a superposition of estimated fluorescent spectra respectively corresponding to the multiple QD-species. The following discussion of the embodiment of FIG. 3 is presented, for simplicity, in reference to a single QD species associated with the tissue.

A goal of the non-linear regression of the image data derived from a particular baseline-corrected image is to produce target data representing a spatial distribution of light intensity emanating from the tissue sample in a spectral band associated with a particular QD species. In order to improve the accuracy of such non-linear regression, several parametric constraints may be imposed on a parametric function chosen to define the spectral profile of a given QD species in order to assure that the target data confidently identifies the given QD species. Such parametric constraints may be dependent, in part, on properties of the used QDs and on the power of the computer processor employed to carry out the nonlinear regression. It should be noted that typical visible-light QD species has light-emission spectrum which, if approximated or fitted by Gaussian function, is characterized by half-width-half-maximum (HWHM) on the order of 20 nm or so, and the σ value of about 11 . . . 20 nm. These typical values can be used as guidance in deciding whether a particular spectral distribution, estimated to be descriptive of light intensity distribution of a QD, is realistic, thereby defining parametric intervals of confidence during the data processing. For example, typical constraints imposed on non-linear regression algorithm in accordance with the present invention may include an evaluation of whether the regressed parameters characterizing the target distribution fall within the parametric intervals of confidence. As an example, in the case of using the QD species defining Gaussian spectral distributions, the typical parametric constraints (also interchangeably referred to as parametric intervals or intervals of confidence) may include i) a value of the regressed mean wavelength $\mu_{reg}$ to be within a narrow range around its expected value, such as within +/−5 nm range; ii) a value of the regressed standard deviation $\sigma_{reg}$ to be less than 20 nm; iii) the quality of the non-linear regression analysis, characterized by $R^2$ value, to be greater than 0.95; and (iv) the number of iterations required to achieve non-linear regression convergence to be smaller than 15. It is understood that these parametric intervals can vary and are chosen based on typical parameters of commercially available fluorescent species.

As an alternative to the nonlinear regression mentioned above, a specific version of linear regression approach may be used. In this case, using the Gaussian fitting function describing the estimated spectral distribution of the QD-light as an example, such Gaussian function should have both the mean and the standard deviation parameters fixed to enable the linear regression process address only a multiplicative term. For example, a linear regression can be performed with respect to a non-linear amplitude of the fitting function all other parameters of which are fixed. It is also noted that, in contradistinction with algorithms of the related art, the non-linear regression is capable of compensating for inevitable statistical spread between the parameters defining spectral distributions of light emitted by different units of QD species. For example, for a given species QD565, which is assumed to generate light at about 565 nm and with a specified standard deviation value, any individual QD may generate light at a mean wavelength that somewhat differs from 565 nm or with a standard deviation that does not precisely match the specified value of the spectral deviation. The non-linear regression algorithm allows for regression that does not have to account for such statistical differences between individual, unit QDs of the QD-species. In particular, the non-linear nature of the regression algorithm allows to compensate for deviations in the parameters (such as non-negative amplitude, mean wavelength, and standard deviation) of non-linear distributions describing the intensity of light emitted by individual QDs, in part because the non-linear regression is effectuated with respect to any of these parameter. In contradistinction, the linear regression approach is carried only with respect to a non-negative amplitude and does not accommodate the practical spread in spectral characteristics of the QDs, thereby reducing the accuracy of the regression.

The target image data, produced by modification of the acquired spectral distribution of intensity based at least on the input multi-spectral image of step 310 and parametric confidence intervals defined by data describing the QDs at step 322, allows to spectrally resolve or isolate the used QD species in the image space and to define a distribution of light emitted by the used QD species across the tissue sample.

These target data are further mapped, at step 326, into a target image array as follows. The target image array corresponds to the target spectral band of the used QD and is co-extensive with or has the same dimensions as an individual image taken in a given spectral band during image acquisition. As the regression process proceeds, an element of the target image array is set to $a^2$ if the target data point associated with a corresponding image pixel satisfies the chosen intervals of confidence, and is assigned a zero value if the corresponding target data point is outside of the intervals of confidence. Following the data mapping procedure of step 326, an optional post-processing 330 can be performed. For example, to remove the target image intensity data representing background noise, the elements of the target image array containing data values that are lower than the mean of the non-zero elements of the target image array may be set to zero, at step 330A. In addition, an image opening process can be performed, at step 330B, to remove any residual background noise (to isolate high spatial frequency components of an image, thereby identifying individual QDs) and to increase the signal-to-noise ratio (SNR). While various types of mathematical "aperture" (for example, a disk aperture or a slit aperture), as represented by a matrix, can be used for this purpose, in one embodiment an order 1 cross matrix $$\begin{pmatrix} 0 & 1 & 0 \\ 1 & 1 & 1 \\ 0 & 1 & 0 \end{pmatrix}$$

can be used. Thus, a refined target image array is further used to form a corresponding target image, at step 336, which represents spectrally-unmixed fluorescent species (here, QDs) emitting light at a regressed mean value of wavelength and may provide a visually-perceivable representation of an optical response of the tissue sample to light emitted by the this unmixed QD species. Finally, the target image can be displayed, at step 340 for example, at a graphical output unit such as an electronic monitor. In addition or alternatively, any of the individual images of which the input hypercube image of step 310 is comprised, can also be displayed, either separately or in combination and for comparison with the target image. Alternatively, the data of the target image array can be stored and/or presented (not shown) for future processing or use in other forms, such as digital or analog.

Example 1

A hypercube image of a prostate tissue, with single QDs species fluorescing at 565 nm (QD565) bound to it, was acquired over the imaging range of wavelengths spanning from 400 nm to 901 nm with the use of an imaging system by Applied Spectral Imaging (ASI, Migdal Ha'Emek, Israel). The hypercube image included 97 spectrally-discrete images, 656×832 pixels. To facilitate the unmixing of the tissue's optical response to light emitted by QD565, the dynamic spectral range of 529 nm to 598 nm was chosen, which takes into account possible differences or deviations in spectral parameters among the individual QD565s. From image data corresponding to 30 individual images within the chosen dynamic spectral range, a spectrum of image intensity was determined for each of 545,762 pixels. These spectral data was further corrected, according to step 318 of FIG. 3, by subtracting the minimal value of the spectral intensity from each of the data points. The LMA non-linear regression was applied with the Gaussian fitting function as that of (1), and with initial conditions of a=1, μ=550 and =1. Provided that a result of the non-linear regression for a given pixel satisfied the confidence intervals described above, an element of the target image array corresponding to such pixel was initiated with a value of $a_{reg}^2$. Otherwise, an element of the target array was assigned a zero value, according to step 326 of FIG. 3. The target image array was further modified to remove the background noise and to perform image opening process according to steps 330A, 330B of the algorithm of FIG. 3.

Figure 4A:
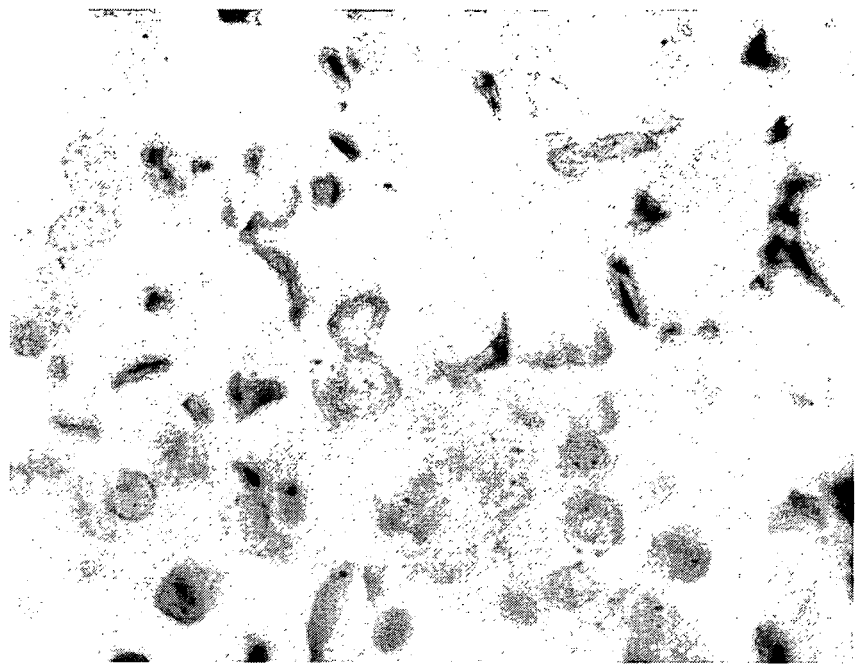
FIGS. 4A and 4B show experimental results of spectral unmixing of a single quantum dot species and corresponding images.
Figure 4B:
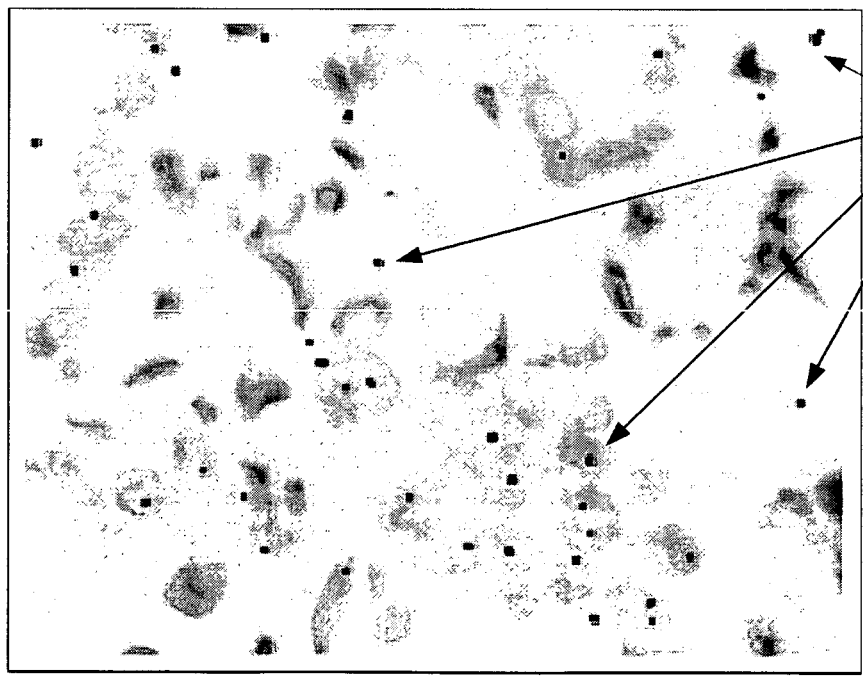

The results of spectral unmixing of QD565s associated with the prostate tissue are shown in FIGS. 4A and 4B. Here, FIG. 4A is an individual image representing a slice, at 565 nm, of the hypercube image of the prostate tissue with QD565, while FIG. 4B is a superposition of the individual image of FIG. 4A with the target image of spectrally-unmixed 565 nm quantum dots 410. The implementation of the method of the inventions confirms the ability of the method to confidently identify the QDs.

Example 2

In a different experiment, breast tissue with n=5 types (five species) of QDs bonded to it was imaged, with 608×656 optical detector pixels, at 90 discrete wavelengths in the imaging spectral range from 402 nm to 800 nm, thereby acquiring a multi-spectral hypercube image. The fluorescent QD species were characterized by typical wavelengths of 490 nm, 525 nm, 565 nm, 625 nm, and 655 nm, and were labeled, accordingly, as $QD_1$=QD490, $QD_2$=QD 525, $QD_3$=QD565, $QD_4$=QD 625, and $QD_5$=QD655 (Life Technologies Corp.). For each of the 398,848 pixels, a spectrum of the detected light intensity was derived and further baseline-corrected, according to steps 316, 318 of FIG. 3. The LMA non-linear regression was further applied, according to step 322 of FIG. 3, to the baseline-corrected spectral intensity with the fitting function $$f(\lambda) = \sum_{i=1}^{n} \frac{a_i^2}{\sigma_i \sqrt{2\pi}} \exp\left[-\frac{1}{2}\left(\frac{\lambda - \mu_i}{\sigma_i}\right)^2\right] \quad (2)$$

representing, in a specific case, a superposition of n=5 Gaussian statistical distributions used as approximations to spectral profiles of the individual QD-species. The initial conditions were chosen to be $a_i=1$ for i=1 through i=5 and ($\mu_1=490$, $\mu_2=525$, $\mu_3=565$, $\mu_4=625$, $\mu_5=655$). The non-linear regression was carried out based on standard deviation values that are typical for spectral distributions for these types of QD species. Generally, a particular parameter of a chosen fitting function is fixed, and a regression is effectuated for the remaining parameters. Once all of the regressed parameters fall within the pre-defined parametric intervals and/or threshold conditions are satisfied, the regression is concluded and the determined regressed parameters are used, with the chosen fitting function, to describe spectral distributions of the individual QD species. In one embodiment, the non-linear regression process as applied to the situation with n=5 QD species proceeds as follows.

First, the regression is applied to the spectra of two chosen species, with an appropriate dynamic spectral range. Here, the regression was first applied to $QD_1=QD490$ and $QD_2=QD525$ species, with the dynamic spectral range chosen to span from 402 nm to 581 nm and the following initial conditions: $\sigma_1=10$ and fixed; $\sigma_2=10$. The confidence intervals included an interval of $470<\mu_{reg,1}<500$ for the regressed value of the mean wavelength for QD490. If the regressed mean wavelength for QD490 were within this interval of confidence, and the spectral intensity amplitude value for QD490 did not exceed a noise threshold value (defined, in a specific embodiment, as a ten-fold value of maximum intensity of the image-forming signal over the range of interest), the contribution of the QD490 species into the spectral intensity distribution of (2) was set to be the Gaussian fit $$f_{reg,1}(\lambda) = \frac{a_{reg,1}^2}{\sigma_{reg,1}\sqrt{2\pi}} \exp\left[-\frac{1}{2}\left(\frac{\lambda - \mu_{reg,1}}{\sigma_1}\right)^2\right]$$

with the regressed parameters. Otherwise, the component of (2) representing the contribution of QD490 species into the spectral intensity distribution (2) was set to zero, $f_{reg,1}(\lambda)=0$.

Next, non-linear regression was applied to the combination of $$f_{reg,1}(\lambda) + \sum_{i=2}^{5} \frac{a_i^2}{\sigma_i \sqrt{2\pi}} \exp\left[-\frac{1}{2}\left(\frac{\lambda - \mu_i}{\sigma_i}\right)^2\right], \quad (3)$$

with initial parameters of $\sigma_2=10$ (for $QD_2=QD525$), $\sigma_3=14$ and fixed (for $QD_3=QD565$), $\sigma_4=20$ (for $QD_4=QD625$), and $\sigma_5=10$ and fixed (for $QD_5=QD655$). At this step, the regressed expression is being sought for QD655. If the resulting regressed parameters satisfy confidence intervals $\sigma_{reg,2}<2$ or $\sigma_{reg,4}<2$ or $[\mu_{reg,5}-\mu_{reg,4}]<5$, as chosen for the non-linear regression procedure, the alternative regression is done with the following parameters: $\sigma_2=10$, $\sigma_3=14$ and fixed, $\sigma_4=15$ and fixed, and $\sigma_5=10$ and fixed. If, however, the resulting regressed parameters fall within satisfy any of the following "fault" intervals ($\mu_{reg,3} \leq \mu_{reg,2}$, $\mu_{reg,3}>585$, $\mu_{reg,5} \leq \mu_{reg,4}$, $\mu_{reg,5}>700$, $\sigma_{reg,3} \leq 2$, $\sigma_{reg,4} \leq 4$, $\sigma_{reg,4}>30$), or if the chosen confidence interval (for example, a 95% interval) included a zero value for any of $a_{reg,4}$, $\mu_{reg,4}$, $\sigma_{reg,4}$, $a_{reg,5}$, then the component $f_{reg,5}(\lambda)$ of (3), representing the contribution of QD655 species into the spectral intensity distribution (3) set to zero, $f_{reg,5}(\lambda)=0$ and the contribution of QD655 is not counted anymore.

In the latter case, the next step of regression included regression of $QD_2=QD525$, $QD_3=QD565$, and $QD_4=QD625$, within the full imaging spectral range from 402 nm to 800 nm, with the use of the following fitting expression:

$$f_{reg,1}(\lambda) + \sum_{i=2}^{4} \frac{a_i^2}{\sigma_i \sqrt{2\pi}} \exp\left[-\frac{1}{2}\left(\frac{\lambda - \mu_i}{\sigma_i}\right)^2\right] \quad (4)$$

and with initial parameters $\sigma_2=10$, $\sigma_3=14$ and fixed, and $\sigma_4=20$. Again, if the regressed parameters fall within the parametric intervals $\mu_{reg,3} \leq \mu_{reg,2}$ or $\mu_{reg,4} \leq \mu_{reg,3}$, or if the confidence intervals for $a_{reg,2}$ or $a_{reg,3}$ or $\mu_{reg,3}$ or $\sigma_{reg,3}$ or $a_{reg,4}$ or $\mu_{reg,4}$ or $\sigma_{reg,4}$ included zero, then the component $f_{reg,3}(\lambda)$ of (4), representing the contribution of QD565 species into the spectral intensity distribution (4) was set to zero, $f_{reg,3}(\lambda)=0$. In this case, the contribution of QD565 to the overall fitting function was not counted anymore, and the remaining non-linear regression step was carried out with the remaining two QD species, $QD_2=QD525$ and $QD_4=QD625$, according to $$f_{reg,1}(\lambda) + \frac{a_2^2}{\sigma_2\sqrt{2\pi}}\exp\left[-\frac{1}{2}\left(\frac{\lambda-\mu_2}{\sigma_2}\right)^2\right] + \frac{a_4^2}{\sigma_4\sqrt{2\pi}}\exp\left[-\frac{1}{2}\left(\frac{\lambda-4}{\sigma_4}\right)^2\right], \quad (5)$$

and the imaging data acquired across the full imaging spectrum of 402 nm to 800 nm. The initially parameters were are $\sigma_2=14$ and fixed, and $\sigma_4=15$ and fixed.

Provided that the results of this last step of non-linear regression assured that $R^2>0.95$, the regressed values $a_{reg,i}^2$ for each of i=1, 2, 3, 4, and 5 were assigned, according to step 326 of FIG. 3, to target image data arrays respectively corresponding to $QD_1=QD490$, $QD_2=QD\,525$, $QD_3=QD565$, $QD_4=QD\,625$, and $QD_5=QD655$. As the next optional step (not shown in FIG. 3), target images corresponding to these target image arrays can be further converted to a binary form using an automatic thresholding based on, for example, the method of maximum entropy as discussed by Kapur et al. in *Computer Vision, Graphics, and Image Processing* (vol. 29, pp. 273-285, 1985). Such binary conversion facilitates the formation and visualization of the image of the tissue at a mean wavelength corresponding to a specific QD species and visualization and/or identification of this QD species on the background of the target image.

Figure 7A:
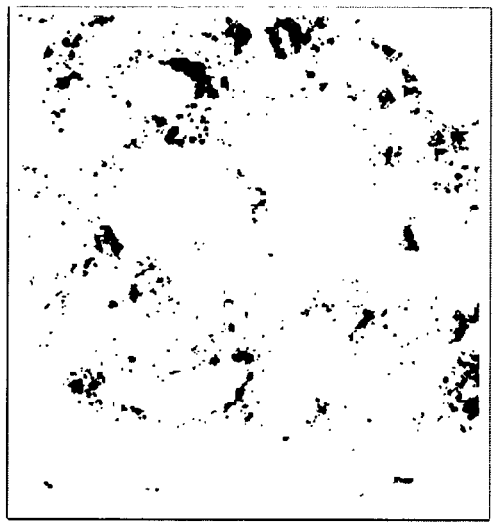
FIGS. 7A and 7B show experimental results of spectral unmixing of a third quantum dot species from a multispectral image of a biological tissue marked with five quantum dot species.
Figure 7B:
Figure 8A:
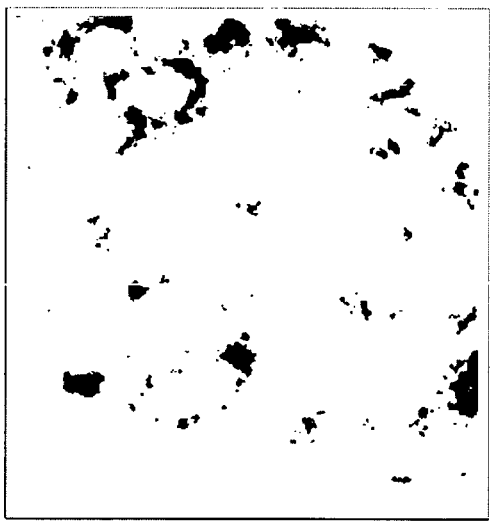
FIGS. 8A and 8B show experimental results of spectral unmixing of a fourth quantum dot species from a multispectral image of a biological tissue marked with five quantum dot species.
Figure 8B:
Figure 9A:
FIGS. 9A and 9B show experimental results of spectral unmixing of a fifth quantum dot species from a multispectral image of a biological tissue marked with five quantum dot species.
Figure 9B:
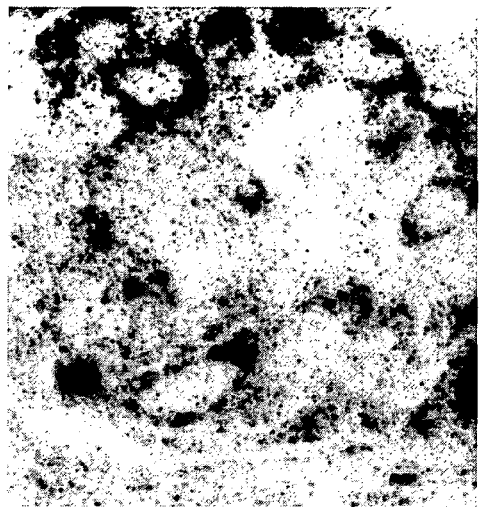

Exemplary results of the method of the invention as applied to the breast tissue marked with $QD_1=QD490$, $QD_2=QD525$, $QD_3=QD565$, $QD_4=QD\,625$, and $QD_5=QD655$ are presented in FIGS. 5A, 5B, 6A, 6B, 7A, 7B, 8A, 8B, 9A, and 9B. FIGS. 5B, 6B, 7B, 8B, and 9B illustrate, for each of the QD species, the individual images corresponding to spectral slices of the hypercube image at the wavelengths of interest (i.e., at $\lambda_1=490$ nm, $\lambda_2=525$ nm, $\lambda_3=565$ nm, $\lambda_4=625$ nm, and $\lambda_5=656$ nm). In comparison, FIGS. 5A, 6A, 7A, 8A, and 9A display the corresponding target, unmixed images each of which represents an optical response of the images tissue to fluorescent emission of the respectively corresponding species of QDs. FIGS. 5B, 7B, and 9B are presented with the 25× scaled intensity, while FIGS. 6B and 8B depict the 5× scaled intensity, which, in both cases, reflects the relative strength of light incident on the tissue.

FIGS. 12A, 12B provide a simple illustration of a situation where the use of an image opening procedure (such as a procedure of step 330B of FIG. 3) may be preferred. The image of FIG. 12A corresponds to an image of a single QD obtained as a result of the step 330A of FIG. 3, after the removal of background noise from the target image data. In addition to the identified QD (pixel group 1202), the presence of residual noise (pixels 1202, 1204) can be observed. After the "image opening" procedure, carried out with a unit matrix $$\begin{pmatrix} 1 & 1 & 1 \\ 1 & 1 & 1 \\ 1 & 1 & 1 \end{pmatrix}$$

representing a circular aperture, the residual background noise is removed, as shown in FIG. 12B.

While the invention is described through the above-described exemplary embodiments, it will be understood by those of ordinary skill in the art that modifications to, and variations of, the illustrated embodiments may be made without departing from the inventive concepts disclosed herein. For example, although some aspects of a method of the invention have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. While specific values chosen for embodiment of the invention are recited, it is to be understood that, within the scope of the invention, the values of all of parameters may vary over wide ranges to suit different applications. Additionally, the use of nanocrystal quantum dots having different wavelength characteristics than those herein utilized. Furthermore, disclosed aspects, or portions of these aspects, may be combined in ways not listed above. Accordingly, the invention should not be viewed as being limited to the disclosed embodiment(s).

The invention claimed is:

1. An apparatus for imaging a biological sample, comprising:
    an input configured to receive at least one of imaging data acquired from and an image of the biological sample illuminated with first and second light sources located on the biological sample,
        wherein said first light source has a first mean wavelength and a first spectral intensity described by a first statistical distribution,
        wherein the second light source has a second mean wavelength and a second spectral intensity described by a second statistical distribution;
        and
    a processor adapted
        (i) to receive the at least one of the imaging data and the image from the input, to non-linearly regress spectral data associated with the at least one of the imaging data and the image, and to generate data representing a target image of the biological sample at a first mean wavelength, and
        (ii) to non-linearly regress the imaging data by fitting said imaging data to a function representing a combination of the first and second statistical distributions within confidence intervals corresponding to parameters of the first and second statistical distributions.

2. An apparatus according to claim 1, further comprising a display operably connected to the processor and configured to display said target image of the biological sample.

3. An apparatus according to claim 2, wherein the display is further configured to display an image of a light source, from the first and second light source, superimposed on said target image.

4. An apparatus according to claim 1, wherein the image of the biological sample includes a multispectral image representing a plurality of spectrally-discrete images acquired in a corresponding plurality of discrete spectral bandwidths.

5. A method for transforming a pathology image, the method comprising:
    receiving a set of images of a tissue sample having a first fluorescent species disposed thereon to acquire a spectral distribution of light intensity representing said tissue sample, wherein the receiving includes receiving a hypercube image of a tissue sample having a second fluorescent species;
    modifying the acquired spectral distribution of intensity based on at least non-linear regression and data confidence intervals defined by said fluorescent species such as to derive a target distribution of light intensity representing said tissue image in a target spectral band; and
    mapping said target distribution of light intensity into a visually-perceivable representation of an optical response of said tissue sample to light emitted by said fluorescent species.

6. A method according to claim 5, further comprising
    conjugating said fluorescent species with the surface of said tissue sample, wherein the conjugating is representative of a material structure of said tissue sample.

7. A method according to claim 5, wherein the receiving the set of images includes receiving a plurality of two-dimensional (2D) images acquired in a plurality of discrete spectral bandwidths.

8. A method according to claim 5, wherein the target spectral band and data confidence intervals define a fluorescence spectrum of said fluorescent species.

9. A method according to claim 8, wherein the target spectral band defines a statistical distribution chosen from a group consisting of a Gaussian distribution, an inverse Gaussian distribution, an exponentially modified Gaussian distribution, a Gamma distribution, an inverse Gamma distribution, a logarithmic distribution, a t-distribution, a chi-square distribution, an f-distribution, an exponential distribution, a Laplace distribution, a Rayleigh distribution, a logistic distribution, a Maxwell distribution, a beta distribution, a Cauchy distribution, a Pareto distribution, a Levy distribution, an extreme value distribution, a Weibull distribution, and a Gumbell distribution.

10. A method according to claim 5, wherein the mapping includes off-setting said target distribution of light intensity to derive an off-set light intensity distribution that is devoid of intensity distribution representing background image noise.

11. A method according to claim 10 wherein the off-setting includes:
    assigning values of said target distribution of light intensity to elements of a data array;

determining a mean value of non-zero-element of said data array; and zeroing elements of said data array that contain values lower than said mean value.

12. A method according to claim 10, wherein the mapping further includes transforming the off-set light intensity distribution with a use of an order 1 cross matrix.

13. A method according to claim 5 wherein the modifying the acquired spectral distribution of intensity includes a non-linear regression of said acquired spectral distribution to a fitting function that defines a linear superposition of estimated fluorescent spectra of the first and second fluorescent species.

14. A method according to claim 13, wherein at least some of parameters defining said estimated fluorescent spectra are fixed within said data confidence intervals.

15. A system for imaging a biological sample, the system comprising:
an optical system including:
an input configured to receive light from the biological sample that contains at least one light source on a surface thereof, said at least one light source including a quantum dot;
an output in optical communication with the input along at least one optical axis;
a spectrally-selective system disposed along the at least one optical axis between said input and said output and configured to process the light in a plurality of spectral bandwidths to form a plurality of image-forming signals corresponding to said plurality of spectral bandwidths;
a detector configured to receive, from the output, the plurality of image-forming signals corresponding to said plurality of spectral bandwidths and to form a plurality of images therefrom;
a computer processor operably connected with the detector; and
a tangible non-transitory storage medium having computer-readable instructions embedded therein which, when loaded onto the computer processor, cause the processor to:
derive, from the plurality of images, a spectral distribution of intensity representing the biological sample; and
apply a non-linear regression algorithm to a curve-fit equation to determine a distribution of intensity of light, emitted by said at least one light source, across the biological sample.

16. A system according to claim 15, wherein said at least one light source includes a source of fluorescent light.

17. A system according to claim 15, wherein said at least one light source includes multiple light sources and the curve-fit equation defines spectral distributions of light emitted by said multiple light sources.

18. A method for identifying a biological structure of a tissue sample with the use of a quantum dot (QD), the method comprising:
receiving image-forming light from the tissue sample, said image-forming light including light emitted by a QD species conjugated with a component of the tissue sample in accordance with a predetermined affinity between said QD species and said component;
analyzing said image-forming light in a plurality of spectral bands to determine a spectral distribution of intensity thereof;
estimating a spectral distribution of said QD species with a parametric fitting function and confidence intervals defining parameters of said parametric fitting function;
deriving image data representing spatial position of the component of the tissue sample in a spectral bandwidth corresponding to said QD species, wherein the deriving includes non-linearly regressing the estimated spectral distribution of said QD species to determine regressed parameters, of the parametric fitting function, that satisfy the confidence intervals.

19. A method according to claim 18, further comprising specifying the component of the tissue sample based on said derived image data and the predetermined affinity.

20. A method according to claim 18, wherein the deriving includes generating an image of the tissue sample.

21. A method according to claim 18, wherein the parametric fitting function includes a statistical distribution function.

* * * * *